United States Patent
Atsuta et al.

(10) Patent No.: US 7,317,291 B2
(45) Date of Patent: Jan. 8, 2008

(54) FREQUENCY CONTROL CIRCUIT, MOTOR DRIVE APPARATUS, FREQUENCY CONTROL METHOD, CONTROL METHOD OF MOTOR DRIVE APPARATUS, AND PROGRAM ALLOWING COMPUTER TO EXECUTE CONTROL METHOD

(75) Inventors: Akio Atsuta, Yokohama (JP); Shinichi Yamashita, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/552,407

(22) Filed: Oct. 24, 2006

(65) Prior Publication Data

US 2007/0090779 A1    Apr. 26, 2007

(30) Foreign Application Priority Data

Oct. 26, 2005   (JP) .............................. 2005-311959

(51) Int. Cl.
*H02P 1/00*   (2006.01)

(52) U.S. Cl. ................... 318/119; 318/120; 310/323.02

(58) Field of Classification Search ................ 318/119, 318/120, 128; 310/323.02
See application file for complete search history.

(56) References Cited

U.S. PATENT DOCUMENTS 5,656,881 A    8/1997   Atsuta
5,696,421 A *  12/1997  Zumeris et al. ............. 310/328
5,698,930 A *  12/1997  Takagi .................... 310/323.03
6,747,394 B2 * 6/2004   Johansson et al. ...... 310/323.02
7,109,639 B2   9/2006   Yamamoto

FOREIGN PATENT DOCUMENTS

JP        03-289375      12/1991
JP        2004-320846    11/2004

* cited by examiner

*Primary Examiner*—Rina I. Duda
(74) *Attorney, Agent, or Firm*—Canon U.S.A. Inc I.P. DV

(57) ABSTRACT

A frequency control circuit including a control circuit for setting a set value, an adding circuit for adding the set value per unit time and effecting counting based on the adding result, and a signal output circuit for outputting an alternating signal of a cycle corresponding to the time necessary for the count result by the adding circuit to reach a target value. The control circuit sets the set value as a value which does not correspond to a submultiple of the target value, and the adding circuit starts the counting of a next cycle when the count result reaches the target value. The control circuit further sets an initial value of the counting of the next cycle in accordance with a value of a portion of the adding results, exceeding the target value when the count result reaches the target value.

9 Claims, 12 Drawing Sheets

FREQUENCY CONTROL CIRCUIT, MOTOR DRIVE APPARATUS, FREQUENCY CONTROL METHOD, CONTROL METHOD OF MOTOR DRIVE APPARATUS, AND PROGRAM ALLOWING COMPUTER TO EXECUTE CONTROL METHOD

BACKGROUND OF THE INVENTION

1. Field of the Invention

The present invention relates to a frequency control circuit, a motor drive apparatus, a frequency control method, a control method of the motor drive apparatus, and a program allowing a computer to execute the control method, which allow a mobile member brought into contact with a vibrator vibrated by a piezoelectric element to relatively move by a friction force.

2. Description of the Related Art

Heretofore, in general, an oscillatory wave (vibration type) motor called as an ultrasonic motor or a piezoelectric motor has been developed and put to practical use. The oscillatory wave motor, as is well-known, is a motor configured to apply an alternating voltage to an electromechanical energy conversion element such as the piezoelectric element or an electrostrictive element so as to allow the element to generate high frequency vibration, thereby taking out vibration energy as a consecutive mechanical movement. The principle of operation of the oscillatory wave motor is already known in many documents such as Japanese Patent Application Laid-Open No. H03-289375 (corresponding to U.S. Pat. No. 5,656,881), and therefore, the description thereof will be omitted.

FIG. 12 is an external view of a stick ultrasonic motor according to a conventional example and the taking out of supply of voltage and output of voltage of the piezoelectric element.

In FIG. 12, an ultrasonic motor 100 includes a vibrator 101 having an insulating sheet 104 provided at an end surface thereof, a rotor 102, and an output gear 103. The vibrator 101 is configured by a combination of the piezoelectric element or the electrostrictive element and an elastic member. The vibrator 101 is configured to include the piezoelectric elements A1 and B1, electrode plates A-d, A'-d, B-d and B'-d sandwiching the elements A1 and B1, a vibration detection element S1, an electrode plate S-d, and an insulating sheet 105, and to be four-phase driven (blocks A, A', B and B'). The drive signal of the block A is fed to the electrode plate A-d, the drive signal of the block A' fed to the electrode plate A'-d, the drive signal of the block B fed to the electrode plate B-d, and the drive signal of the block B' fed to the electrode plate B'-d. There exists no common electrode (GND).

In the above described configuration, the blocks A and A' and the blocks B and B' are fed with the DUTY 50% drive signals of reversed phases, to be driven so that the voltages with reverse phase are applied to both ends of the piezoelectric elements A1 and B1, respectively.

FIG. 13 is a block diagram showing the configuration of the drive circuit of the stick ultrasonic motor 100 of FIG. 12.

In FIG. 13, the drive circuit includes switching circuits 110a and 110b, a microcomputer 111, a voltage detection circuit 112, a phase difference detection circuit 113, inductance elements 114 and 116, and capacitance elements 115 and 117. The switching circuits 110a and 110b use FFTs as the switching elements. Each FFT is provided with a diode that allows a current flowing in a reverse direction to pass through. By providing this diode, the FFT is prevented from being damaged by the current flowing in the reverse direction.

The inductance elements 114 and 116 and the capacitance elements 115 and 117 are the elements that adapt impedance to the ultrasonic motor 100. By providing the impedance elements to the positions shown in FIG. 13, it is possible to drive the ultrasonic motor 100 at a low voltage and at high efficiency by the four-phase driving method described in FIG. 12. Note that the capacitance elements 115 and 117 are not necessarily included.

The voltage detection circuit (for example, A/D converter) 112 detects a magnitude of Vbat of the power supply voltage fed to the switching circuits 110a and 110b, and loads it into the microcomputer 111. In practice, based on a detection result of the voltage detection circuit 112, a pulse width and the like of the drive signal are changed, and an input power for the ultrasonic motor 100 is controlled.

FIG. 14 is an external oblique view of the vibrator of an oscillatory wave actuator proposed aiming at much smaller size.

In FIG. 14, the vibrator 201 of the oscillatory wave actuator includes an elastic member 204 made of a metallic material and formed in the shape of an oblong plate, a piezoelectric element (electro-mechanical energy conversion element) 205 joined to the rear surface of the elastic member 204, and projection portions 206 disposed on the top surface of the elastic member 204. This oscillatory wave actuator is disclosed in Japanese Patent Application Laid-Open No. 2004-320846 (corresponding to U.S. Pat. No. 7,109,639), and therefore, the detailed description thereof will be omitted.

The projection portion 206, as will be described below, moves a driven body by having the top ends thereof contacted to the driven body. The vibrator 201 can excite vibration of bending vibration modes, and by combining these two bending vibration modes, an elliptic motion can be generated at the top end of the projection portion 206.

FIG. 15A is a view showing one bending vibration mode, and FIG. 15B is a view showing the other bending vibration mode.

In FIGS. 15A and 15B, the vibration mode shown in FIG. 15A represents one bending vibration mode (referred to as mode A) of the two bending vibration modes. The mode A indicates a secondary bending vibration in a long side direction (direction of an arrow mark X) of the vibrator 201 (elastic member 204), and has three nodes parallel with a short side direction (direction of an arrow mark Y). The projection portion 206 is installed in the vicinity of a position where a node appears in the vibration of the mode A, and performs a reciprocating motion by the vibration of the mode A in the direction to the arrow mark X. By installing the projection portion 206 in this manner, the projection portion 206 can be displaced at the maximum in the direction to the arrow mark X.

The vibration mode shown in FIG. 15B represents the other bending vibration mode (referred to as mode B) of the two bending vibration modes. The mode B indicates a primary bending vibration in a short side direction (direction of an arrow mark Y) to the vibrator 201 (elastic member 204), and has two nodes parallel with the long side direction (direction of the arrow mark X). Here, the nodes in the mode A and the nodes in the mode B are approximately orthogonal to one another within X and Y planes. The projection portion 206 is installed in the vicinity of a position where a loop appears in the vibration of the mode B, and performs a reciprocating motion in the direction of an arrow mark Z by the vibration of the mode B. By installing the projection portion 206 in this manner, the projection portion 206 can be displaced at the maximum in the direction of the arrow mark Z.

That is, as described above, by allowing the nodes of the modes A and B to be approximately orthogonal to one another, the positions of the nodes of the mode A and the positions of the loop of the mode B can be matched. By installing the projections 206 at these positions, the vibration displacement of the projections 206 can be made to the largest extent, thereby obtaining high output. As described above, by displacing the projection portions 206 in X and Z directions on a large scale, the driven body contacting the projection portions 206 can be given a large driving force.

FIG. 16 is an external oblique view of the oscillatory wave actuator including the vibrator of FIG. 14.

In FIG. 16, the oscillatory wave actuator includes a vibrator having the elastic member 204, the piezoelectric element 205, and the projections 206, and a slider 207. The vibrations of the mode A and the mode B are generated with the predetermined phase differences therebetween, so that the elliptic motion can be generated at the top end of the projection portion 206. The top end of the projection portion 206 is pressure-contacted with the slider 207, which is the driven body. The slider 207 can move in a direction to an arrow mark L by the elliptic motion of the projection portion 206.

If the two projections 206 are symmetrically installed with respect to an XZ plane or a YZ plane that passes through the center of the elastic member 204, a reaction force received from the slider 207 in the projection portion 206 can be received by the vibrator without deviation. Because of stabilizing a relative position relationship between the slider 207 and the projection portion 206, the output of the vibrator can be stabilized without being affected by fluctuation and the like of environment and load.

The miniature oscillatory wave motor capable of exciting the two bending vibration modes in such a simple structure can separately generate two bending vibration modes. Hence, by controlling the magnitude of the voltage applied to the piezoelectric element 205 and the phase difference of two driving signals corresponding to each of the two bending vibration modes, the moving velocity of the slider 207 can be easily changed.

However, when the oscillatory wave motor is miniaturized and the driving frequency of the oscillatory wave motor becomes high, the driving frequency and a control step of the phase difference of the driving signals of the two bending vibrations become rough in the conventional oscillatory wave motor driving circuit that creates an oscillating frequency by dividing a digital clock. Hence, there arises a problem that, in the vicinity of a resonance frequency of the oscillatory wave motor, it is impossible to control the driven body (slider) by a minute moving velocity step.

SUMMARY OF THE INVENTION

The present invention is directed to a frequency control circuit, a motor drive apparatus, and a frequency control method.

According to one aspect of the present invention, a frequency control circuit includes a control circuit configured to set a set value, an adding circuit configured to add the set value per unit time and, based on an adding result, to effect counting, and a signal output circuit configured to output an alternating signal of a cycle corresponding to the time necessary for the count result by the adding circuit to reach a target value. The control circuit sets the set value as a value that does not correspond to a submultiple of the target value, and the adding circuit starts the counting of the next cycle when the count result reaches the target value, and sets an initial value of the counting of the next cycle in accordance with a value of a portion of the adding result, exceeding the target value, when the count result reaches the target value.

According to another aspect of the present invention, a motor drive apparatus for driving an oscillatory wave motor that moves a driven body brought into contact with a vibrator, by generating vibration in the vibrator by an electromechanical energy conversion element, the motor drive apparatus includes the frequency control circuit disclosed above.

According to still another aspect of the present invention, a motor drive apparatus for driving an oscillatory wave motor that moves a driven body brought into contact with a vibrator, by providing a time-wise phase difference between at least two vibration modes that generate vibrations at different positions of the vibrator respectively by an electromechanical energy conversion element, includes a control circuit configured to set a set value and a first value showing the phase difference, a first adding circuit configured to add the set value per unit time and, based on an adding result, to effect counting, a second adding circuit configured to add the set value per unit time and, based on an adding result and the first value showing the phase difference, to effect counting, and a signal output circuit configured to output a first alternating signal of a cycle corresponding to the time necessary for the count result by the first adding circuit to reach a target value, and a second alternating signal of a cycle corresponding to the time necessary for the count result by the second adding circuit to reach the target value. The control circuit sets the set value as a value that does not correspond to a submultiple of the target value, and the first and second adding circuits start the counting of a next cycle when the count result reaches the target value, and sets an initial value of the counting of the next cycle in accordance with a value of a portion of the adding results, exceeding the target value, when the count result reaches the target value.

According to yet still another aspect of the present invention, a frequency control method includes setting a set value, adding the set value per unit time, effecting counting by using the adding result in the adding step, outputting an alternating signal of a cycle corresponding to the time necessary for the count result in the count step to reach a target value. The setting step includes setting the set value as a value that does not correspond to a submultiple of the target value, and the counting step starts the counting of a next cycle when the count result reaches the target value, and setting an initial value of the counting of the next cycle in accordance with a value of a portion of the adding results, exceeding the target value, when the count result reaches the target value.

According to still another aspect of the present invention, a method for driving an oscillatory wave motor that moves a driven body brought into contact with a vibrator, by providing a time-wise phase difference between at least two vibration modes that generate vibrations at different positions of the vibrator respectively by an electromechanical energy conversion element, includes setting a set value and a first value showing the phase difference, adding the set value per unit time, firstly effecting counting by using the adding result in the adding step, secondly effecting counting by using the adding result in the adding step and the first value showing the phase difference, and outputting a first alternating signal of a cycle corresponding to the time necessary for the count result in the first counting step to reach a target value, and a second alternating signal of a cycle corresponding to the time necessary for the count result in the second counting step to reach the target value. The setting step includes setting the set value as a value that does not correspond to a submultiple of the target value, and the first and second count steps start the counting of the next cycle when the count result reaches the target value, and setting an initial value of the counting of the next cycle in accordance with a value of a portion of the adding results, exceeding the target value, when the count result reaches the target value.

According to still another aspect of the present invention, a computer readable medium of the present invention stores a program for causing a computer to execute the frequency control method disclosed above.

According to still another aspect of the present invention, a computer readable medium of the present invention stores a program for causing a computer to execute the method of driving an oscillatory wave motor as disclosed above.

Further features and aspects of the present invention will become apparent from the following detailed description of exemplary embodiments with reference to the attached drawings.

DESCRIPTION OF THE EMBODIMENTS

The following description of various exemplary embodiments, features and aspects of the present invention is merely illustrative in nature and is in no way intended to limit the invention or uses.

First Embodiment

Figure 1:
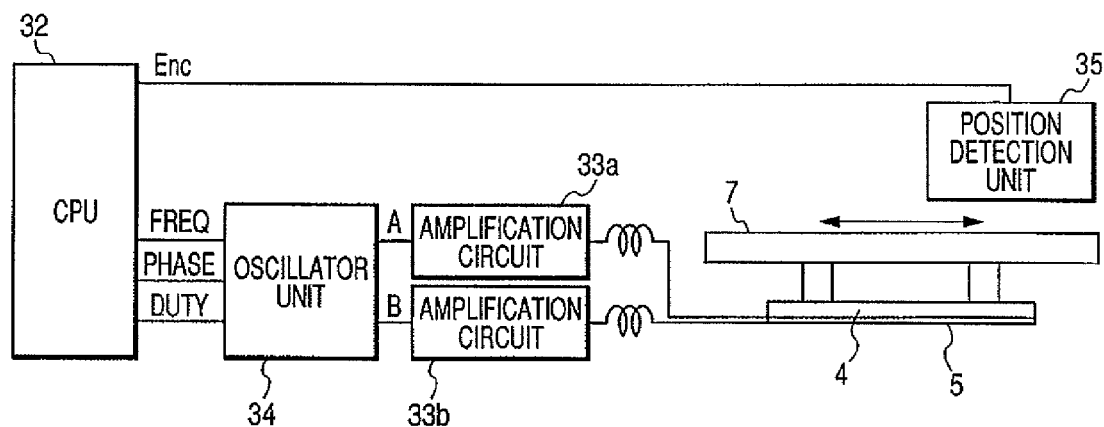
FIG. 1 is a block diagram showing a configuration of an oscillatory wave motor drive circuit as a motor drive apparatus according to a first embodiment of the present invention.

FIG. 1 is a block diagram showing a configuration of an oscillatory wave motor drive circuit as a motor drive apparatus according to a first embodiment of the present invention.

In FIG. 1, an oscillatory wave motor is configured as an ultrasonic motor including a vibrator 4, a piezoelectric element 5, and a mobile member (slider) 7. An oscillatory wave motor drive circuit includes a microcomputer (hereinafter, referred to as CPU) 32, an amplifier circuit 33a, an amplifier circuit 33b, an oscillator unit 34, and a position detection unit 35.

In the oscillatory wave motor, the piezoelectric element 5 is an electromechanical energy conversion element that generates high frequency oscillation by application of an alternating electric field. The vibrator 4 is joined to the surface of the piezoelectric element 5, and is an elastic member installed in the mobile member 7 in a contact state. The vibrator 4 excites two bending vibration modes (a first vibration mode (mode A) which is a secondary bending vibration in a long side direction of the vibrator and a second vibration mode (mode B) which is a primary bending vibration in a short side of the vibrator) by the piezoelectric element 5. The vibration of the mode A and the vibration of the mode B are given with time-wise phase differences therebetween, so that an elliptic motion is performed on surface particles of the vibrator 4, thereby moving the mobile member 7 by a friction force in the direction indicated by an arrow.

In the oscillatory wave motor drive circuit, the CPU 32 manages a control of each unit of the drive circuit. The CPU 32 outputs a FREQ signal (oscillation frequency set value), a PHASE signal (phase difference set value), and a DUTY signal (duty set value) to the oscillator unit 34. The oscillator unit 34, according to the set value (command value) outputted from the CPU 32, performs an oscillating operation that generates a drive signal to drive the oscillatory wave motor by the mode A and a drive signal to drive the oscillatory wave motor by the mode B. The oscillator unit 34 is provided with an unillustrated counter of a predetermined number of bits (for example, 20 bits in the present embodiment) and a comparator for determining whether counting reaches a target count value.

The amplifier circuit 33a amplifies the drive signal of the mode A, and gives a driving force to the oscillatory wave motor through an inductance element. The amplifier circuit 33b amplifies the drive signal of the mode B, and gives a driving force to the oscillatory wave motor through an inductance element. The position detection unit 35 detects the movement amount of the mobile member 7. The CPU 32 drives and controls the oscillatory wave motor according to the information (position information and velocity information on the mobile member 7) which is based on the movement amount of the mobile member 7 detected by the position detection unit 35.

In the present embodiment, though a description is made by citing the oscillatory wave motor drive circuit that feeds the two-phase drive signal to the vibrator having the first vibration mode (mode A) and the second vibration mode (mode B) as an example, it is not limited to this. According to the number of vibration modes carried by the vibrator to feed the drive signal, and according to the number of phases of the drive signal to be fed, the number of phases of the drive signal to be outputted from the oscillator unit 34 is changed.

Figure 2:
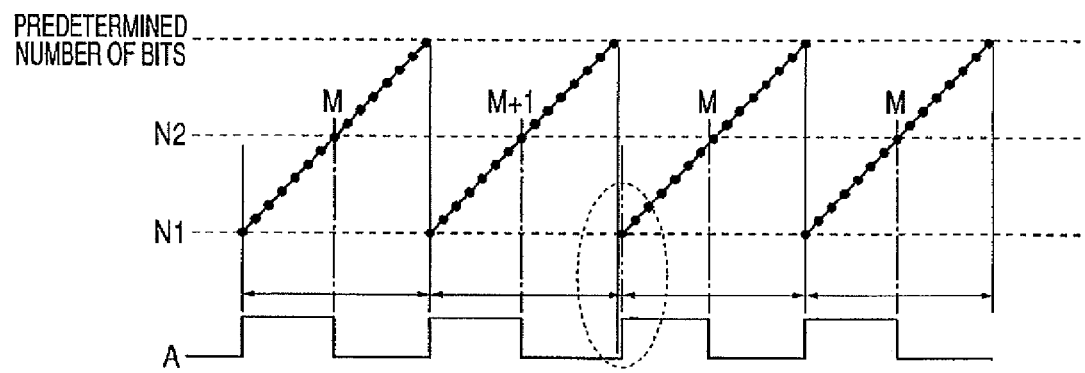
FIG. 2 is a drawing for explaining a mechanism for outputting an oscillation frequency signal by an oscillator unit of the oscillatory wave motor drive circuit of FIG. 1.

FIG. 2 is a drawing for explaining a mechanism in which the oscillator unit 34 of the oscillatory wave motor drive circuit outputs an oscillation frequency signal (drive signal).

In FIG. 2 is shown the case where an axis of ordinate plots the count values of the counter of the oscillator unit 34 and an axis of abscissas plots the time, and is shown the case of one phase output that outputs the drive signal of the mode A. In the oscillator unit 34, a value set by the FREQ signal outputted from the CPU 32 is added to the counter at some clock timing. As a result, the count value of the counter increases over time. The value added to the counter is a point shown by a black solid dot.

First, the oscillator unit 34 operates in such a manner that a pulsed drive signal (output signal) outputted to the oscillatory wave motor is made Hi when the count value of the counter exceeds N1 (here, it is taken as zero), and the output signal is made Lo when the count value exceeds N2. When this operation is repeated, the counter overflows and returns to zero (one cycle), and at that time, the oscillator unit 34 sets the output signal back to Hi. By repeating this operation for each clock, the counter overflows, and the oscillation frequency signal corresponding to the number of times of this operation repeated until the count value exceeds N1 is outputted from the oscillator unit 34.

Here, the oscillator unit 34 continues to oscillate with the same oscillation frequency when a value set in accordance with the number of bits of the counter and the FREQ signal outputted from the CPU 32 is a numeric value just divisible. In other words, the oscillation frequency set value is a submultiple of the value relating to the number of bits. On the contrary, when a value set in accordance with the number of bits of the counter and the FREQ signal outputted from the CPU 32 is a numeric value indivisible (i.e., not a submultiple), the number of times of this repeated operation appears in a cycle having M and M+1. For example, when the clock is 27 MHz and the number of bits of the counter is 20 bits, an oscillation frequency can be obtained on the basis of FREQ×27 MHz/(2^20). Here, the case where the value of the FREQ signal is set to 6990 is cited as an example, to describe the operation of the counter in detail with reference to FIG. 2.

Since 2^20 (20th power of 20) is 1048576, the count value of the counter increases from zero to 1048575, and a total of 1048576 is added, so that the count value returns to zero again. In the initial cycle, the value of the count starts addition from a state in which zero is set as an initial value, and when the 150th clock is inputted, the value of the counter reaches 1048500. Since the upper limit value of the counter is 1048575, at the next 151st clock, the counter reaches the upper limit value by adding 6990, and 6915 is added to the next cycle beyond the upper limit value. In the next second cycle, since the value of the counter starts addition from a state in which 6914 is set as the initial value, the value reaches the upper limit value at the 150th clock, and 6839 is added to the next third cycle beyond the upper limit value. In the next third cycle, since the value of the counter starts addition from a state in which 6838 is set as an initial value, the value reaches the upper limit value at the 150th clock, and 6763 is added to the next third cycle beyond the upper limit value. In this manner, from the second cycle up to the 91st cycle, the upper limit of the counter is reached at the 150th clock (M in FIG. 2). At the 92nd cycle, since the value of the counter starts addition from a state in which 74 is set as the initial value, the upper limit value of the counter is not reached at the 150th clock, and the upper limit value of the counter is reached at the 151st clock (M+1 in FIG. 2). Subsequent to the 93rd cycle, the operation of reaching the upper limit of the counter at the 150th clock is repeated again for some time.

In this example, the frequency of the drive signal at the first and the 92nd cycle is 178.81 kHz, and the frequency of the drive signal from the second to the 91st cycle is 180.00 kHz. If this is repeated in the long term, then, the average frequency of the drive signal is 6990×27 MHz/(2^20) ≈179.99 kHz. In this manner, it is possible to set the frequency of the drive signal in a range narrower than resolution of the clock by the oscillator unit 34.

Here, though the operation in which the oscillator unit 34 restores the output signal into Hi when the counter overflows to be set back to zero, has been cited as an example, it does not matter if the operation is such that the oscillator unit 34 restores the output signal into Hi by overflowing the counter repeatedly two or three times. With setting in this manner, it is possible to generate the drive signal of much lower frequency.

The value set out by the FREQ signal outputted from the CPU 32 may be set to a numeric value that divides the number of bits of the counter, according to needs.

Figure 3:
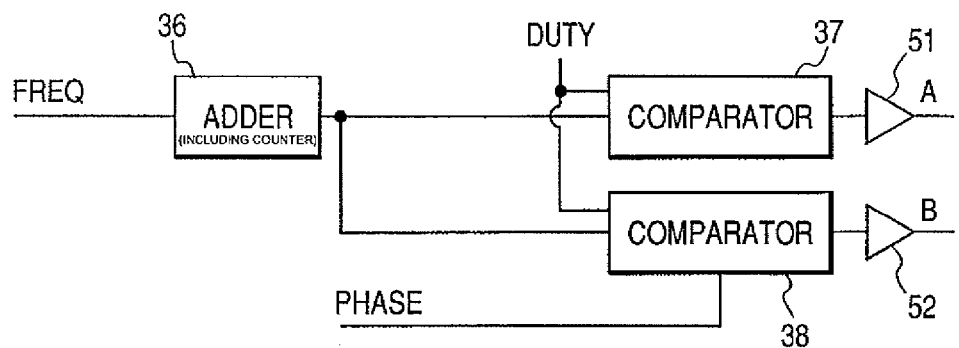
FIG. 3 is a block diagram showing a configuration of a two-phase oscillator which is a specific example of the oscillator unit of FIG. 2.

FIG. 3 is a block diagram showing the configuration of a two-phase oscillator which is a specific example of the oscillator unit 34.

In FIG. 3, the oscillator unit (two-phase oscillator) 34 includes an adder 36, a comparator 37, a comparator 38, an amplifier 51, and an amplifier 52. The adder 36 adds the value (oscillation frequency set value) set by the FREQ signal outputted from the CPU 32, and contains the counter. The comparator 37 generates the drive signal of the mode A outputted to the oscillatory wave motor. The comparator 37 is configured to be able to set a pulse width, that is, a trailing edge timing of the output signal according to the set value of the DUTY signal outputted from the CPU 32.

The comparator 38 generates the drive signal of the mode B outputted to the oscillatory wave motor. The comparator 38 inputs the count value at which the output signal is made Hi and Lo, as a PHASE signal outputted from the CPU 32, while the comparator 37 outputs the drive signal of the mode A. The comparator 38, similarly to the comparator 37, is also configured to be able to set a pulse width, that is, a trailing edge timing of the output signal according to the value of the DUTY signal outputted from the CPU 32.

Figure 4:
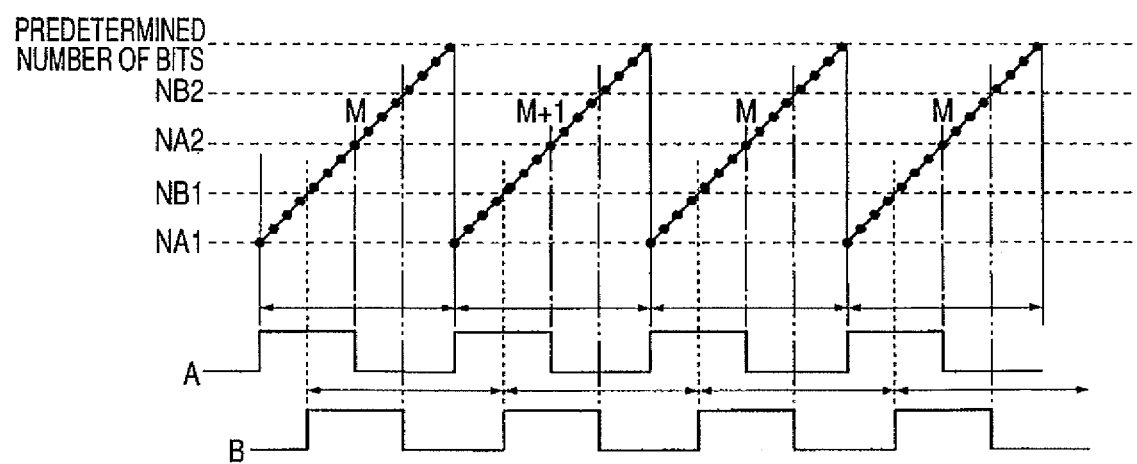
FIG. 4 is a drawing for explaining the mechanism for obtaining the phase difference signal from the oscillator unit by the configuration of FIG. 3.

FIG. 4 is a drawing for explaining the mechanism for obtaining a phase difference signal from the oscillator unit 34 by the configuration of FIG. 3.

In FIG. 4, the axis of ordinate plots the count values and the axis of abscissas plots the time, to show the case of two-phase output that outputs the drive signal of the mode A having a pulse waveform shape, outputted to the oscillatory wave motor and the drive signal of the mode B having the pulse waveform shape, outputted to the oscillatory wave motor. In the case of one phase output shown in FIG. 2, it is set such that when the counter value exceeds N1, the output signal is made Hi, and the output signal is made Lo when the count value exceeds N2.

In the case of the two-phase output shown in FIG. 4, it is set such that at the drive signal output time of the mode A (output A), the output signal is made Hi when the count value exceeds NA1, and the output signal is made Lo when the count value exceeds NA2. It is also set such that at the drive signal output time of the mode B (output B), the output signal is made Hi when the count value exceeds NB1, and the output signal is made Lo when the count value exceeds NB2. That is, the set values NA1, NA2, NB1, and NB2 are provided for the outputs A and B to make the output signals Hi and Lo, and each of NA1 and NA2 is for the output A, and each of NB1 and NB2 is for the output B.

For example, when the phase in which the output B is made Hi is set to 90°, if the entire counter is 20 bits, 1048576 (=2^20) (oscillation frequency set value) is the count value for one cycle portion (until the counter overflows and returns to Zero). Hence, if the output B is set to be Hi at the time of 1048576×¼ (count value NB1 =262144) (target value), the output B becomes a signal delayed by 90° in phase as against Hi of the output A (count value NA1=zero). If DUTY is 50%, the count value at which the output B is made Lo is NA2=524288 (target value), and NB2=786432 (target value). By setting arbitrarily the zone of Hi in the drive signal and the zone of Lo, the drive signals different in DUTY can also be obtained.

In the present embodiment, the oscillator unit 34 is configured and operated as described above, so that the drive signal of the mode B which is shifted (delayed) in phase against the drive signal of the mode A and has the same frequency and pulse width as the drive signal of the mode A can be obtained. Here, consideration is given to the setting of the phase difference between the output (output A) of the drive signal of the mode A and the output (output B) of the drive signal of the mode B. In the present embodiment, since the oscillator unit 34 is provided with a counter of 20 bits, it is possible to set one cycle by fineness of 20 bits, and the setting resolution of the phase difference is 360 degrees/ 1048576=0.000343. Thus, when the oscillator unit 34 having the above described configuration is used, the output signal having fine phase difference in addition to the frequency can be obtained.

In the oscillatory wave motor (ultrasonic motor), the phase difference between the output (output A) of the drive signal of the mode A and the output (output B) of the drive signal of the mode B is finely set, so that the moving velocity of the mobile member 7 can be changed. In this case, in the ultrasonic motor using the conventional different bending vibration modes, as compared with the ultrasonic motor using the same bending vibration modes, a blind zone of the moving velocity of the mobile member 7, caused by a phase difference control, is hard to arise even if the phase difference between the output A and the output B is close to zero degree (the moving velocity can be finely controlled).

As described above, according to the present embodiment, the oscillator unit 34 adds the oscillation frequency set value by the counter per some unit time, and when the additional value exceeds the set value, the operation of switching between Hi and Lo of the drive signal is repeated, thereby obtaining the drive signals of the mode A and the mode B. Based on this, it is possible to finely set the oscillation frequency of the oscillator unit 34 and the phase difference between the drive signal (output A) of the mode A and the drive signal (output B) of the mode B. As a result, in the vicinity of the resonance frequency of the oscillatory wave motor, it is possible to control the mobile member 7 by fine moving velocity.

Second Embodiment

Figure 5:
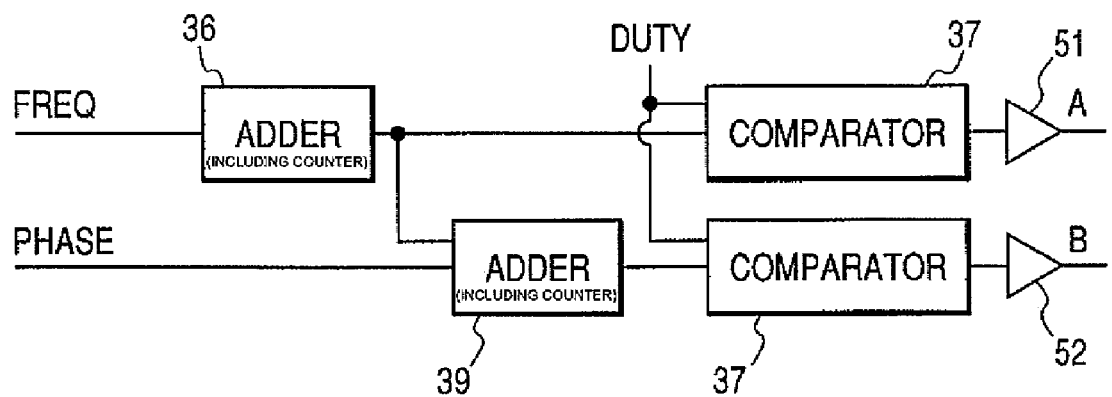
FIG. 5 is a block diagram showing the configuration of a two-phase oscillator which is a specific example of an oscillator unit according to a second embodiment of the present invention.

A second embodiment of the present invention is different from the first embodiment described above in that the oscillator unit of the oscillatory wave motor drive circuit has a configuration shown in FIG. 5. Other components of the present embodiment are the same as those of the first embodiment (FIG. 1) described above, the description thereof will be omitted.

FIG. 5 is a block diagram showing the configuration of a two-phase oscillator which is a specific example of an oscillator unit 34 according to the present embodiment.

In FIG. 5, the oscillator unit (two-phase oscillator) 34 includes an adder 36 having the counter, an adder 39 having the counter, a comparator 37 for the drive signal output of a mode A, a comparator 37 for the drive signal output of a mode B, an amplifier 51, and an amplifier 52. The adder 36 and the comparator 37 for the drive signal output of a mode A are the same as the first embodiment. The adder 39 sets a phase difference for the output value of the adder 36 in accordance with the set value of a PHASE signal outputted from a CPU 32.

Figure 6:
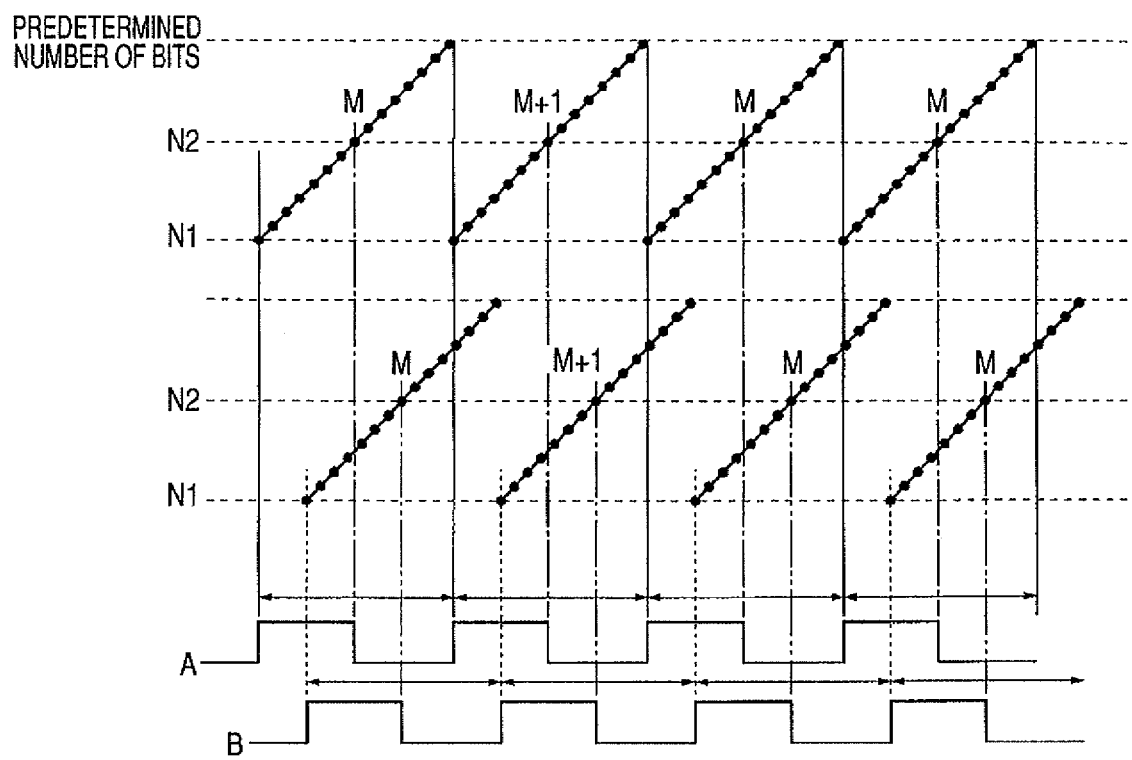
FIG. 6 is a drawing for explaining the mechanism for obtaining the phase difference signal from the oscillator unit by the configuration of FIG. 5.

FIG. 6 is a drawing for explaining the mechanism for obtaining a phase difference signal from the oscillator unit 34 by the configuration of FIG. 5.

In FIG. 6, the axis of ordinate plots count values, and the axis of abscissas plots the time, and is shown the case of a two-phase output that outputs the drive signal of a mode A and the drive signal of a mode B. In the case of the two-phase output shown in FIG. 4, the set values NA1, NA2, NB1, and NB2 at which the output signals of the oscillator unit 34 are made Hi and Lo are provided for the output A and the output B, and each of NA1 and NA2 is provided for the output A, and each of NB1 and NB2 is provided for the output B.

In the case of the two-phase output shown in FIG. 6, though the oscillator unit 34 is equipped with two comparators 37, the set values at which the output signals of the oscillator unit 34 are made Hi and Lo are equal for both the output A and the output B, and denoted by N1 and N2. The adder 39 functions as a phase circuit for adding the set value (value corresponding to the phase difference) of the PHASE signal outputted from the CPU 32 and the value outputted from the adder 36.

As evident from FIG. 6, the signal outputted from the adder 39 is shifted in phase by the set value portion of the phase difference. The signal outputted from the adder 39 is inputted to the comparator 37 for outputting the drive signal of the mode B having the same configuration as the comparator 37 for outputting the drive signal of the mode A, so that the drive signal of the mode B equal to the drive signal of the mode A in DUTY and different in only phase can be obtained.

In the present embodiment, the oscillator unit 34 is configured and operated as described above, so that when the phase difference between the output A and the output B is set, the count value at which the output signals of the oscillator unit 34 are made Hi and Lo is not required to be calculated with respect to the output A and the output B. That is, just by changing the set value of the PHASE signal, it is possible to change the phase difference.

As described above, according to the present embodiment, the oscillator unit 34 is provided with the adder 39, and the phase difference is set out according to the set value of the PHASE signal with respect to the output of the adder 36. Based on this, when the phase difference between the output A and the output B is set, it is possible to change the phase difference just by changing the set value of the PHASE signal, and it is possible to make simple the configuration of the software that controls the oscillatory wave motor drive circuit.

Third Embodiment

Figure 9:
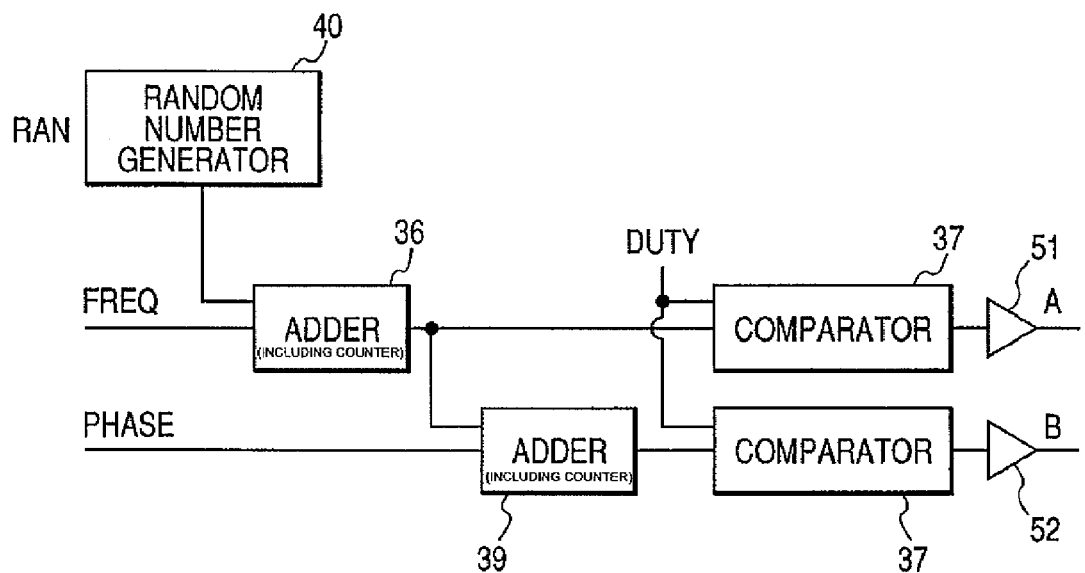
FIG. 9 is a block diagram showing the configuration of the two-phase oscillator which is the specific example of the oscillator unit for attaining oscillation frequency characteristics of FIG. 8.

A third embodiment of the present is different from the first embodiment in that the oscillator unit of an oscillatory wave motor drive circuit has a configuration shown in FIG. 9. Other components of the present embodiment are the same as those corresponding to the first embodiment (FIG. 1) described above, and therefore, the description thereof will be omitted.

Figure 7:
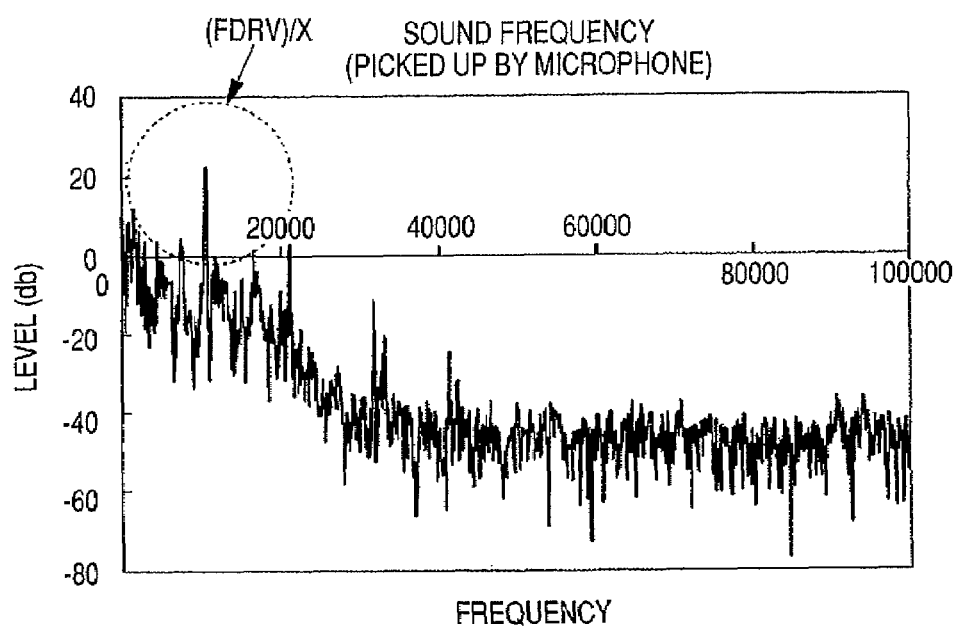
FIG. 7 is a drawing showing FFT spectrum where sound in some frequency of a drive signal of an oscillatory wave motor is detected by a microphone.

FIG. 7 is a drawing showing FFT (Fast Fourier Transform) spectrum where sound in some frequency of the drive signal of the oscillatory wave motor in the first embodiment described above is detected by a microphone.

In FIG. 7, the axis of ordinate shows a level (db) of sound detected by the microphone, and the axis of abscissas shows the frequency (Hz) of the driving signal. As illustrated, a peak of the level of sound appears at some frequencies of the drive signal. The peak of the frequency of the drive signal is produced in accordance with the relationship between the oscillation frequency (FDRV) of the oscillator unit 34 in the first embodiment and a frequency X (for example, when the counter returns to the original state each time ten cycles are generated, the frequency X=10) generated according to a fraction of the counter. Here, assuming that the oscillation frequency of the oscillator unit 34 is 100 kHz and the cycle in which the counter returns to the original state is 10, then (FDRV)/X=100/10=10 kHz, and the FFT spectrum of that frequency is generated.

On the other hand, there is a problem that the FFT spectrum is generated in an audible region and is then heard as sound. As a cause of being heard as sound, it is considered that a frequency component generated by the oscillator unit 34 is fixed, and a level of sound of a specific frequency becomes a frequency component which is sharp and peeked. Hence, the present embodiment is improved so as not to generate the peeked frequency component.

Figure 8:
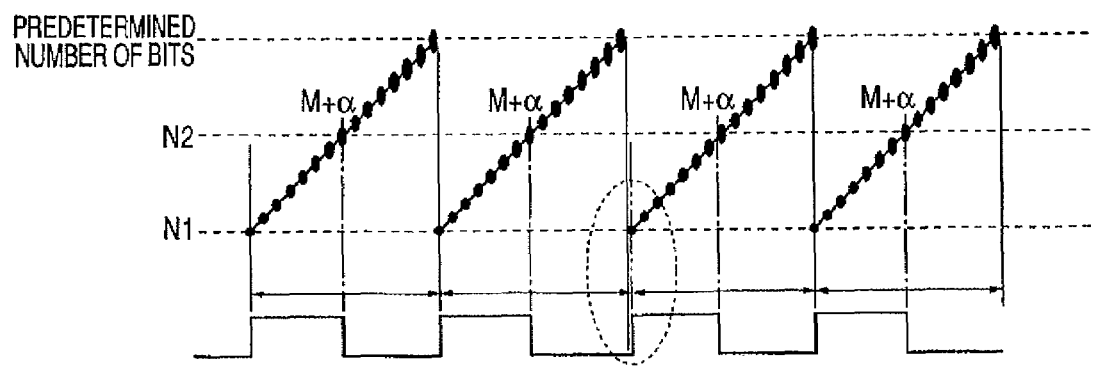
FIG. 8 is a drawing for explaining a principle of outputting an oscillation frequency signal by an oscillator unit according to a third embodiment of the present invention.

FIG. 8 is a drawing for explaining a principle of outputting an oscillation frequency signal by the oscillator unit 34 according to the present embodiment. FIG. 9 is a block diagram showing the configuration of the two-phase oscillator which is the specific example of the oscillator unit 34 for attaining oscillation frequency characteristics of FIG. 8.

In FIGS. 8 and 9, the oscillator unit (two-phase oscillator) 34 includes a random number generator 40, an adder 36 having the counter, an adder 39 having the counter, a comparator 37, a comparator 37, an amplifier 51, and an amplifier 52. In the first embodiment, the set value of the FREQ signal outputted from the CPU 32 was repeatedly added by the adder 36 at the clock timing. In contrast to this, in the present embodiment, the oscillator unit 34 is provided with the random number generator 40 that generates a RAN (random number), and the set value (oscillation frequency set value) of the FREQ signal+RAN (random number) is added by the adder 36.

In the present embodiment, the oscillator unit 34 is configured and operated as described above, so that the value added to the counter of the oscillator unit 34 increases and decreases as shown in FIG. 8 and the cycle until the counter reaches an overflow value becomes random and irregular. In FIG. 8, the added points denoted by a black solid dot correspond to either one of the vertically-longitudinal areas, and the cycle until the counter exceeds the value of the predetermined number of bits is also influenced by the random number, thereby generating a short cycle and a long cycle.

Here, it is a size a of the random number that decides the irregularity of the cycle, and if the range of α is large, the irregularity of the cycle, that is, the oscillation frequency becomes also large. As a result, the frequency component generated peek-wise decreases, and the level of sound falls, thereby obtaining the technological advantages that it is not heard as sound.

As described above, according to the present embodiment, the oscillator unit 34 is provided with the random number generator 40, and the set values of the RAN (random number), which generated in the random number generator 40, and the FREQ signal are added by the adder 36. As a result, the peek frequency component in which a level of sound of the specific frequency becomes sharp is decreased, and it is possible to solve the problem that the FFT spectrum is generated in the audible area and is heard as sound.

In the present embodiment, though a description has been made on the example in which the configuration of the two-phase oscillator shown in FIG. 5 is added with the random number generator 40, the configuration of the two-phase oscillator shown in FIG. 3 may be added with the random number generator 40.

Fourth Embodiment

Figure 10:
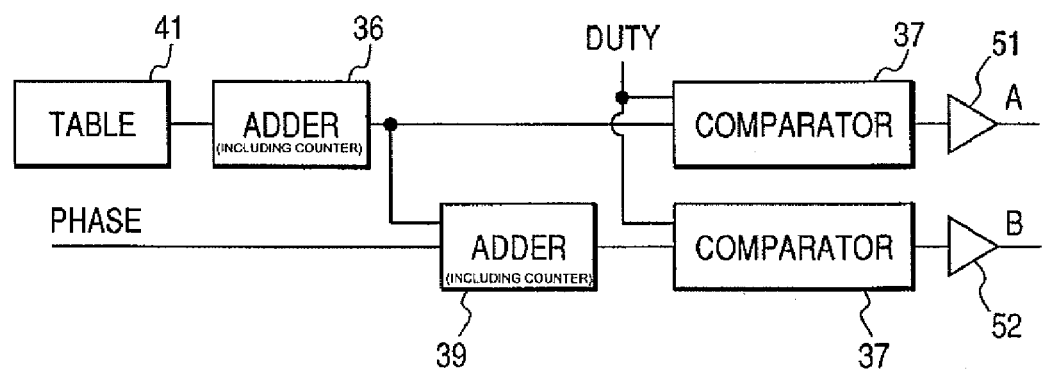
FIG. 10 is a block diagram showing the configuration of the two-phase oscillator which is the specific example of an oscillator unit according to a fourth embodiment of the present invention.

A fourth embodiment of the present invention is different from the first embodiment described above in that an oscillator unit of the oscillatory wave motor drive circuit has a configuration shown in FIG. 10. Other components of the present embodiment are the same as those corresponding to the first embodiment (FIG. 1) described above, and therefore, the description thereof will be omitted.

FIG. 10 is a block diagram showing the configuration of the two-phase oscillator which is the specific example of an oscillator unit 34 according to an embodiment of the present invention.

In FIG. 10, the oscillator unit (two-phase oscillator) 34 includes a table 41, an adder 36 having the counter, an adder 39 having the counter, a comparator 37, a comparator 37, an amplifier 51, and an amplifier 52. The table 41 stores a list of the parameters FREQ that decide the oscillation frequency. A CPU 32 selects the frequency (value of the parameter FREQ) which can not be heard like a sound by a person as described below.

Figure 11:
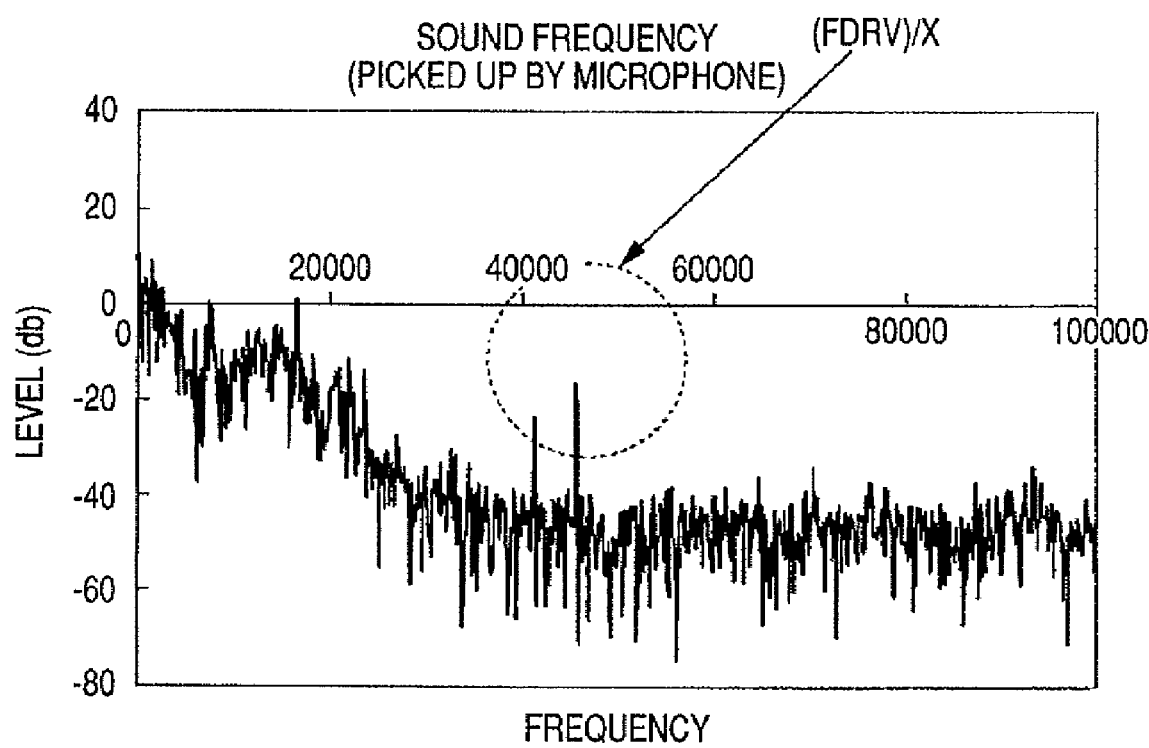
FIG. 11 is a drawing showing the FFT spectrum where sound in some frequency of a drive signal of an oscillatory wave motor is detected by a microphone.
Figure 12:
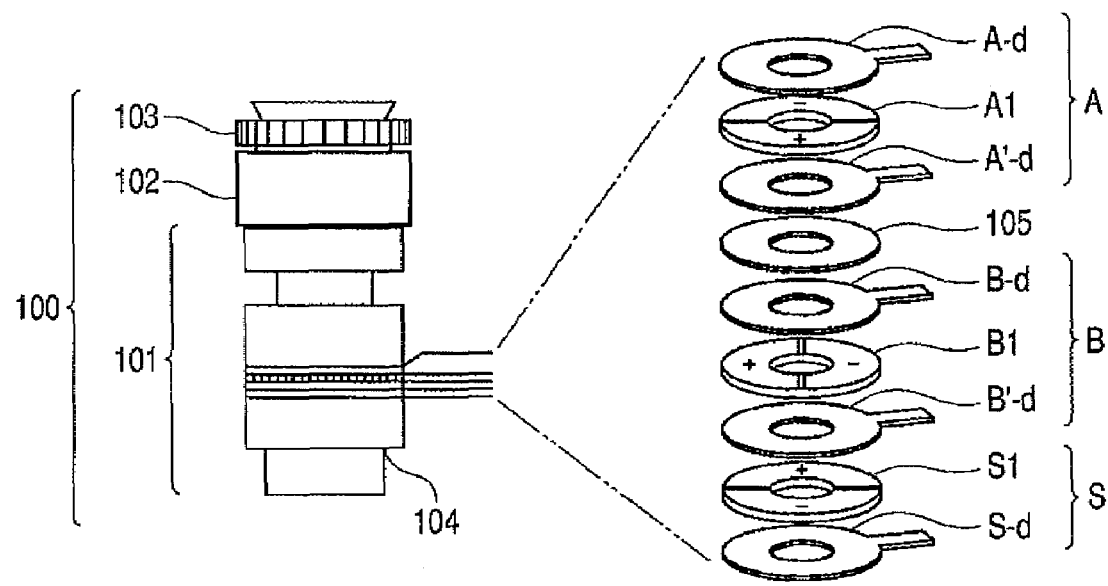
FIG. 12 is a drawing to explain an external view of a stick ultrasonic motor according to a conventional example and supply of voltage and output of voltage of the piezoelectric element according to a conventional example.
Figure 13:
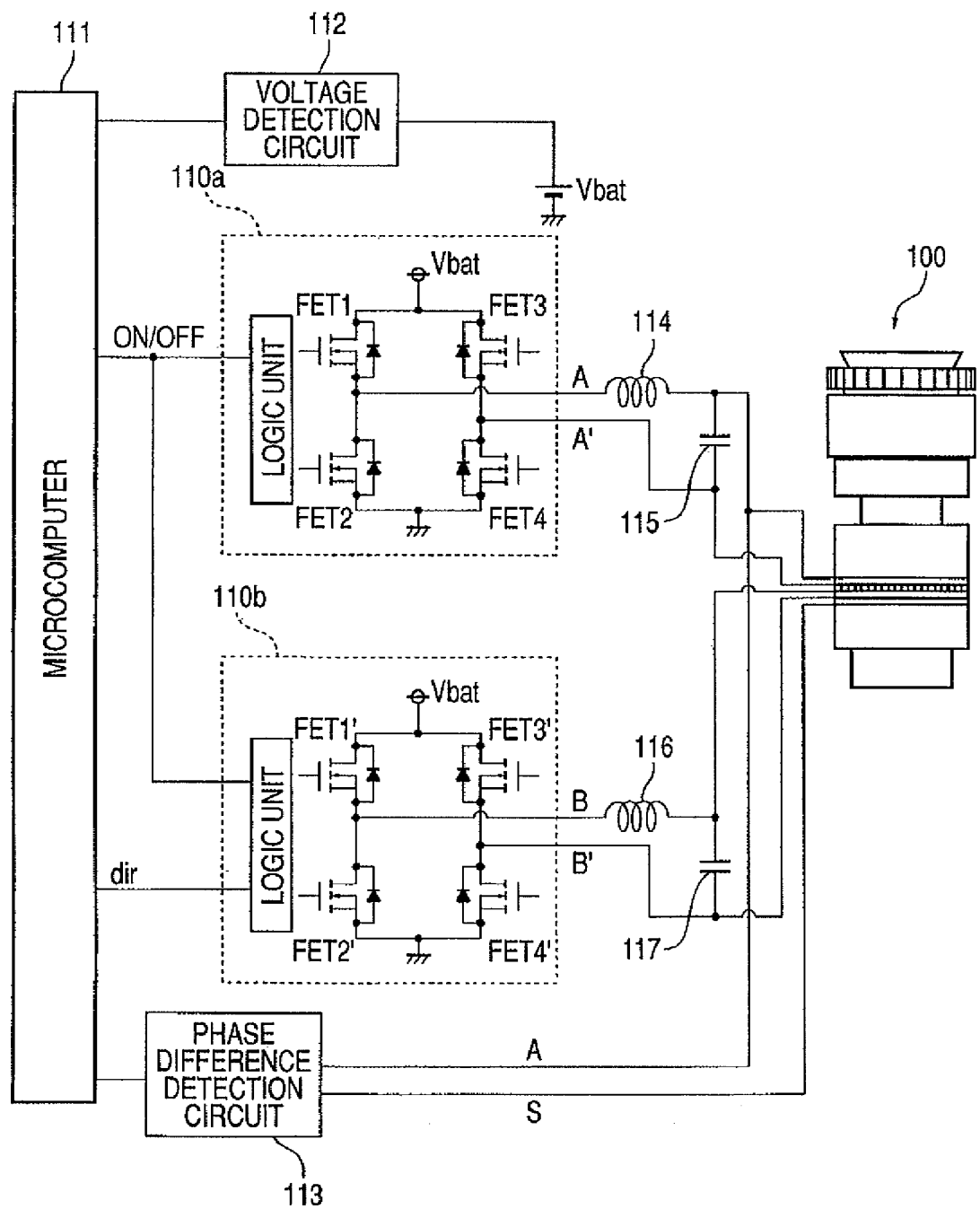
FIG. 13 is a block diagram showing the configuration of the drive circuit of the ultrasonic motor of FIG. 12.
Figure 14:
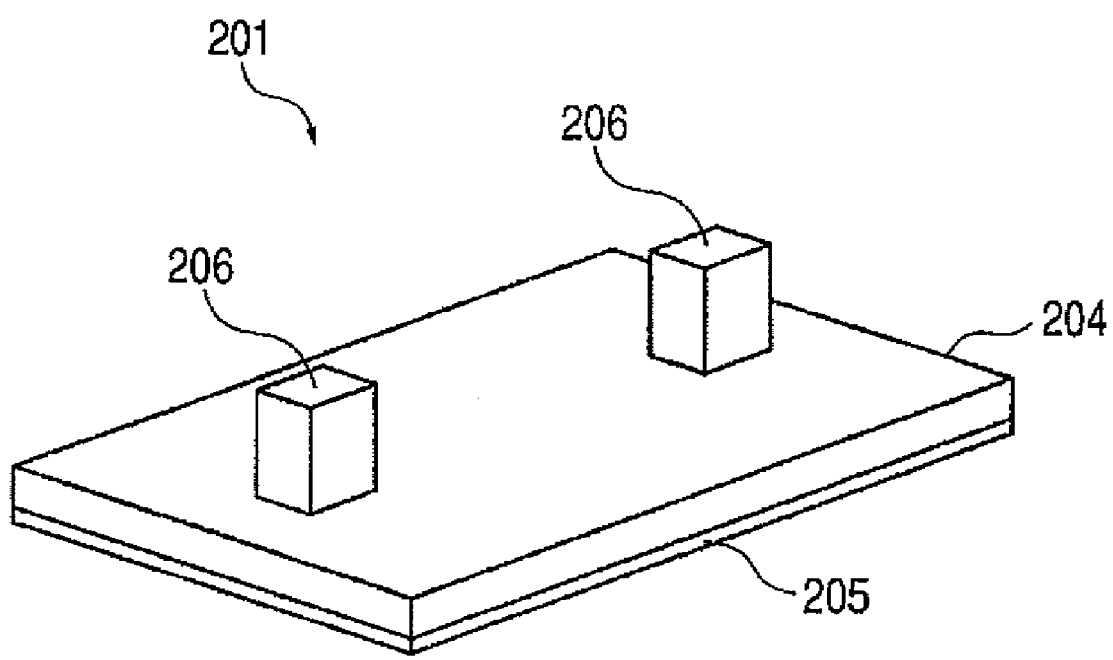
FIG. 14 is an external oblique view of the vibrator of an oscillatory wave actuator.
Figure 15A:
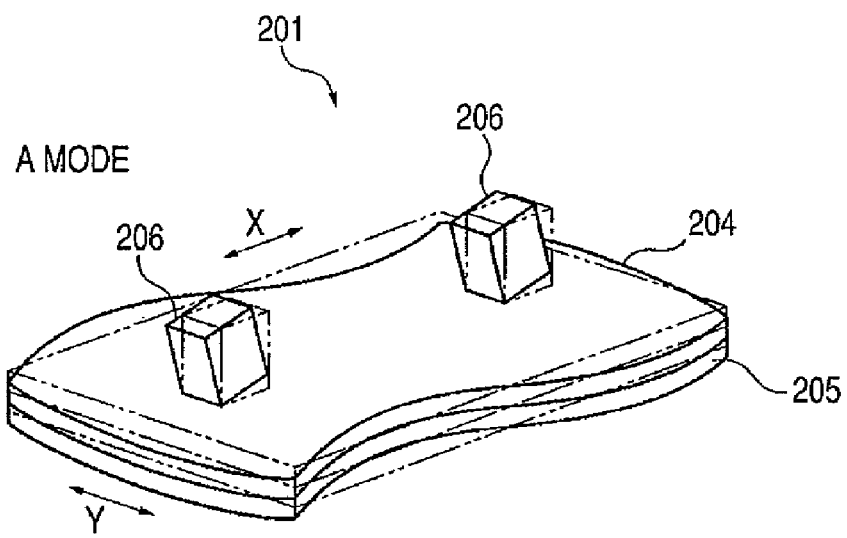
FIG. 15A is a drawing showing one bending vibration mode.
Figure 15B:
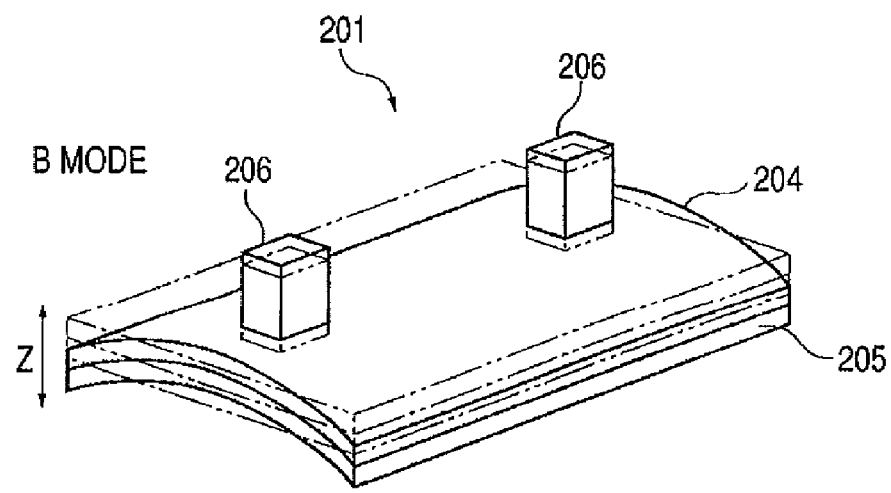
FIG. 15B is a drawing showing the other bending vibration mode.
Figure 16:
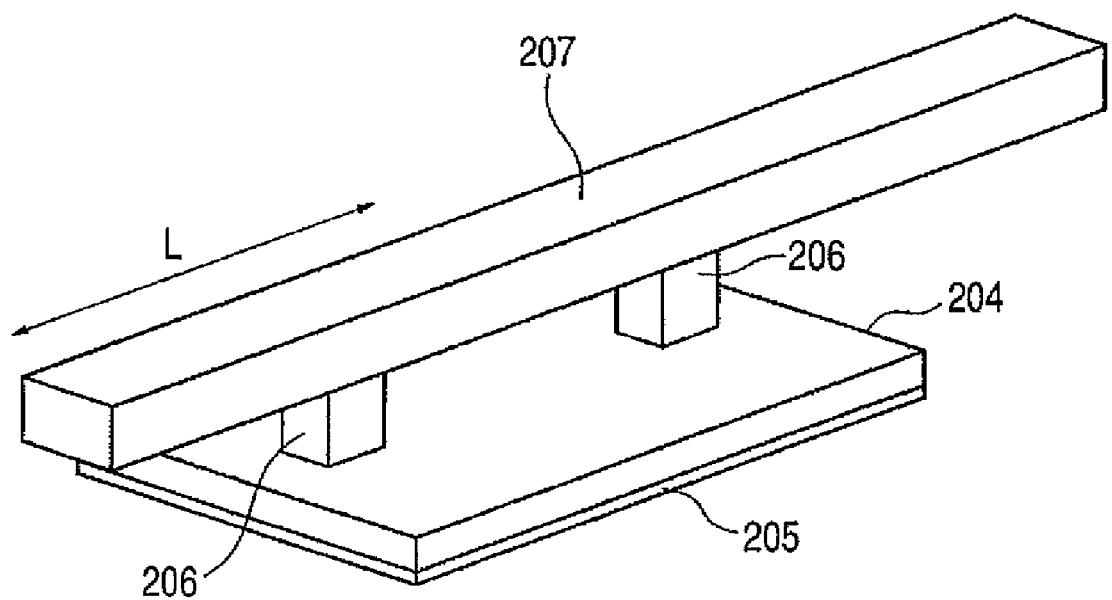
FIG. 16 is an external oblique view of the oscillatory wave actuator including the vibrator of FIG. 14.

FIG. 11 is a drawing showing the FFT spectrum where sound in some frequency of a drive signal of an oscillatory wave motor is detected by a microphone.

In FIG. 11, the axis of ordinate plots a level (db) of sound detected by the microphone, and the axis of abscissas plots the frequency (Hz) of the drive signal. As illustrate, it is clear that a peak appears in the vicinity of the frequency 45 kHz of the drive signal. The peak of the frequency of the drive signal is generated by in accordance with the relationship between the oscillation frequency (FDRV) of the oscillator unit 34 and a frequency X (for example, when the counter returns to the original state for an oscillation of ten cycles, the frequency X=10) generated according to a fraction of the counter. Here, assuming that the oscillation frequency of the oscillator unit 34 is 180 kHz and the cycle in which the counter returns to the original state is 4, then (FDRV)/X=180/4=45 kHz, and the FFT spectrum of that frequency is generated.

At this time, though a peak appears in the vicinity of the frequency 45 kHz, since this frequency is a frequency of the area not audible to the person, it does not matter. That is, even if a peak is generated in the vicinity of a specific frequency of the drive signal, if it is not the frequency audible to the person as sound, it is clear that it is fine. Consequently, as shown in FIG. 10, by preparing a table 41 to select the oscillation frequencies not audible to the person as sound, it is possible to control the generation of sound.

As described above, according to the present embodiment, the oscillator unit 34 is provided with a table that decides the oscillation frequencies, and the oscillation frequencies not audible to the person as sound are selected from the table 41. As a result, it is possible to control the generation of the sound a peak of which is generated in the vicinity of the specific frequency of the drive signal.

In each of the above described embodiments, though a description has been made on the two-phase oscillator cited as an example, the oscillator may be a three-phase oscillator mutually having a phase difference of 120 degrees or a four-phase oscillator mutually having a phase difference of 90 degrees.

Other Embodiments

The present invention provides for a storage medium storing a program code of the software that realizes the function of each embodiment described above to the system or the unit, and by reading and executing the program code stored in the storage medium by the system or the computer of the unit (or CPU, MPU, and the like).

In this case, the program code itself read from the storage medium realizes the function of each embodiment described above, and the program code and the storage medium storing the program code realize the present invention.

As the storage medium for providing the program code, for example, the following can be cited. A floppy (registered trade mark) disk, hard disk, magnetic-optical disk, optical disk such as CD-ROM, CD-R, CD-RW, DVD-ROM, DVD-RAM, DVD-RW, DVD+RW, and the like, magnetic tape, non-volatile memory card, ROM, and the like. Alternatively, the program code may be downloaded through a network.

Besides the fact that the functions of the embodiments described above are realized by executing the program code read by the computer, the execution of the program also includes the case where, based on the instructions of the program code, OS (operating system) and the like working on the computer performs a part or the whole of the actual processing, and by that processing, the functions of the embodiments described above are realized.

It also includes the case where, after the program code read out from the storage medium is written to the memory provided for a function expansion board inserted into the computer or a function expansion unit connected to the computer, based on the instructions of the next program code, the CPU provided in the expansion board or the expansion unit performs a part or the whole of the actual processing, and by that processing, the function of each embodiment described above is realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-311959 filed Oct. 26, 2005, which is hereby incorporated by reference herein in its entirety.

What is claimed is:

1. A frequency control circuit comprises:
   a control circuit configured to set a set value;
   an adding circuit configured to add the set value per unit time and, based on an adding result, to effect counting; and
   a signal output circuit configured to output an alternating signal of a cycle corresponding to the time necessary for the count result by the adding circuit to reach a target value,
   wherein the control circuit sets the set value as a value that does not correspond to a submultiple of the target value, and the adding circuit starts the counting of a next cycle when the count result reaches the target value, and
   wherein the control circuit sets an initial value of the counting of the next cycle in accordance with a value of a portion of the adding result, exceeding the target value when the count result reaches the target value.

2. The frequency control circuit according to claim 1, further comprising a random number generator configured to generate a random number, wherein the adding circuit adds the random number generated by the random number generator to the set value.

3. A motor drive apparatus for driving an oscillatory wave motor that moves a driven body brought into contact with a vibrator, by generating vibration in the vibrator by an electro-mechanical energy conversion element, the motor drive apparatus comprising the frequency control circuit according to claim 1.

4. The motor drive apparatus according to claim 3, further comprising a random number generator configured to generate a random number, wherein the adding circuit adds the random number generated by the random number generator to the set value.

5. A motor drive apparatus for driving an oscillatory wave motor that moves a driven body brought into contact with a vibrator, by providing a time-wise phase difference between at least two vibration modes that generate vibrations at different positions of the vibrator respectively by an electro-mechanical energy conversion element, the motor drive apparatus comprising:
   a control circuit configured to set a set value and a first value showing the phase difference;
   a first adding circuit configured to add the set value per unit time and, based on an adding result, to effect counting;
   a second adding circuit configured to add the set value per unit time and, based on an adding result and the first value showing the phase difference, to effect counting; and
   a signal output circuit configured to output a first alternating signal of a cycle corresponding to the time necessary for the count result by the first adding circuit to reach a target value, and a second alternating signal of a cycle corresponding to the time necessary for the count result by the second adding circuit to reach the target value,
   wherein the control circuit sets the set value as a value that does not correspond to a submultiple of the target value, and the first and second adding circuits start the counting of a next cycle when the count result reaches the target value, and wherein the control circuit sets an initial value of the counting of the next cycle in accordance with a value of a portion of the adding results, exceeding the target value when the count result reaches the target value.

6. A frequency control method comprising:

setting a set value;

adding the set value per unit time;

effecting counting by using the adding result in the adding step; and outputting an alternating signal of a cycle corresponding to the time necessary for the count result in the counting step to reach a target value, wherein the setting step includes setting the set value as a value that does not correspond to a submultiple of the target value, and the counting step includes starting counting of a next cycle when the count result reaches the target value, and setting an initial value of the counting of the next cycle in accordance with a value of a portion of the adding results, exceeding the target value, when the count result reaches the target value.

7. A storage medium computer readably storing a program for causing a computer to execute the frequency control method according to claim 6.

8. A method for driving an oscillatory wave motor that moves a driven body brought into contact with a vibrator, by providing a time-wise phase difference between at least two vibration modes that generate vibrations at different positions of the vibrator respectively by an electro-mechanical energy conversion element, the method comprising:

setting a set value and a first value showing the phase difference;

adding the set value per unit time;

firstly effecting counting by using the adding result in the adding step;

secondly effecting counting by using the adding result in the adding step and the first value showing the phase difference; and outputting a first alternating signal of a cycle corresponding to the time necessary for the count result in the first counting step to reach a target value, and a second alternating signal of a cycle corresponding to the time necessary for the count result in the second counting step to reach the target value, wherein the setting step includes setting the set value as a value that does not correspond to a submultiple of the target value, and the first and second counting steps start the counting of the next cycle when the count result reaches the target value, and setting an initial value of the counting of the next cycle in accordance with a value of a portion of the adding results, exceeding the target value, when the count result reaches the target value.

9. A storage medium computer readably storing a program for causing a computer to execute the method for driving the oscillatory wave motor according to claim 8.

* * * * *